United States Patent [19]

Benton

[11] Patent Number: 5,071,721
[45] Date of Patent: Dec. 10, 1991

[54] MATRIX IMMOBILIZED ELECTROLYTE

[75] Inventor: Barry W. Benton, Orange, Calif.

[73] Assignee: Rosemount Inc., Eden Prairie, Minn.

[21] Appl. No.: 589,935

[22] Filed: Sep. 28, 1990

[51] Int. Cl.$^5$ ............................................. H01M 6/18
[52] U.S. Cl. .................................................. 429/192
[58] Field of Search ........................ 429/192, 191, 33;
252/62.2

[56]  References Cited

U.S. PATENT DOCUMENTS

| 4,654,279 | 3/1987 | Bauer et al. | 429/192 |
| 4,734,343 | 3/1988 | Berthier et al. | 429/213 X |
| 4,798,773 | 1/1989 | Yasukawa et al. | 429/192 |
| 4,849,311 | 7/1989 | Itoh et al. | 429/192 |
| 5,006,431 | 4/1991 | Hope et al. | 429/192 |

Primary Examiner—Anthony Skapars
Attorney, Agent, or Firm—Kinney & Lange

[57] ABSTRACT

A solid electrolyte for use in a reference electrochemical half cell, the electrolyte comprising an insulative binder forming a matrix, a particulate salt dispersed within the binder and immobilized by the binder, and a hydrophilic polymer network disposed within the binder in an amount sufficient to effect ion diffusion within the electrolyte.

15 Claims, 1 Drawing Sheet

MATRIX IMMOBILIZED ELECTROLYTE

BACKGROUND OF THE INVENTION

The present invention relates to electrochemical half cells, and in particular, it relates to an electrolyte within the half cell.

In the prior art, electrochemical cell electrolytes are typically a liquid, gel, or a slurry. Each type of electrolyte has advantages over the other types for a particular use. However, all the prior art electrolytes share some problems.

Dehydration of the electrolyte is a problem. Prior art electrolytes need a high water content. However, water loss to the atmosphere or to the solution being sampled occurs through the cell junction. Cell stability and the life of the cell are reduced by the water loss.

The stability of an electrochemical cell also depends on a fixed ionic concentration at the electrode. Prior art aqueous solution electrolytes easily lose ions through the cell junction due to the high physical mobility of the electrolyte within the cell and the high mobility of the ions within the electrolyte.

Another problem with the prior art half cells are that the electrode within the cell may become poisoned by the sample solution. It is desirable for cell stability that the electrode remain a specific metal/metallic salt. However, sample solutions contain ions that will alter this relationship within the electrode. Such ions should be excluded from the cell, just as the electrolyte ions should be retained within the cell. This problem has been addressed to some extent in the prior art by the use of multiple junctions, each with its own electrolyte to slow down the diffusion of the poisoning ions from the junction at the sample solution to the metal electrode within the cell.

Electrochemical cells also have a problem with a voltage potential developing across the junction. The voltage potential occurs from at least two sources.

The first source is a build-up of salt at the junction. Most aqueous electrolytes contain excess salt to make up for ion loss to the sample solution. Occasionally, the excess salt crystallizes over the junction and can create a very significant error, as great as 50 to 100 mV.

The second source is pressure change that results in the sample solution and/or the electrolyte moving in or out of the cell through the junction. Such movement results in ion species and concentration changes across the junction. Such movement can generate significant error causing potentials.

In an article entitled "A Solid Polymer Electrolyte Internal Reference Electrode for High Temperature Aqueous Systems" by Hettiarachchi a reference electrode having a solid electrolyte is discussed. The electrode is prepared by mixing commercially available high temperature epoxy with an appropriate amount of $Al_2O_3$ filler and a 0.1M KCl solution to a reasonably viscous mix to immobilize the chloride ions. The mixture is placed within a tube having an Ag/AgCl element and the open end of the tube is plugged with a porous zirconia junction to minimize contact between the polymer and the solution to be sampled. Although this electrode is an advancement in the art, the electrolyte is porous in nature due to the ceramic $Al_2O_3$ particles that are bound within the epoxy. In addition, the electrolyte is internally wetted with the KCl solution and is therefore subject to dehydration and ion depletion.

SUMMARY OF THE INVENTION

The present invention includes a solid electrolyte for use in a reference electrochemical half cell. The electrolyte includes an insulative binder forming a matrix, a particulate salt dispersed within the binder and immobilized by the binder, and a hydrophilic polymer network disposed within the binder in an amount sufficient to effect ion diffusion within the electrolyte.

DETAILED DESCRIPTION OF THE PREFERRED EMBODIMENTS

Figure 1:
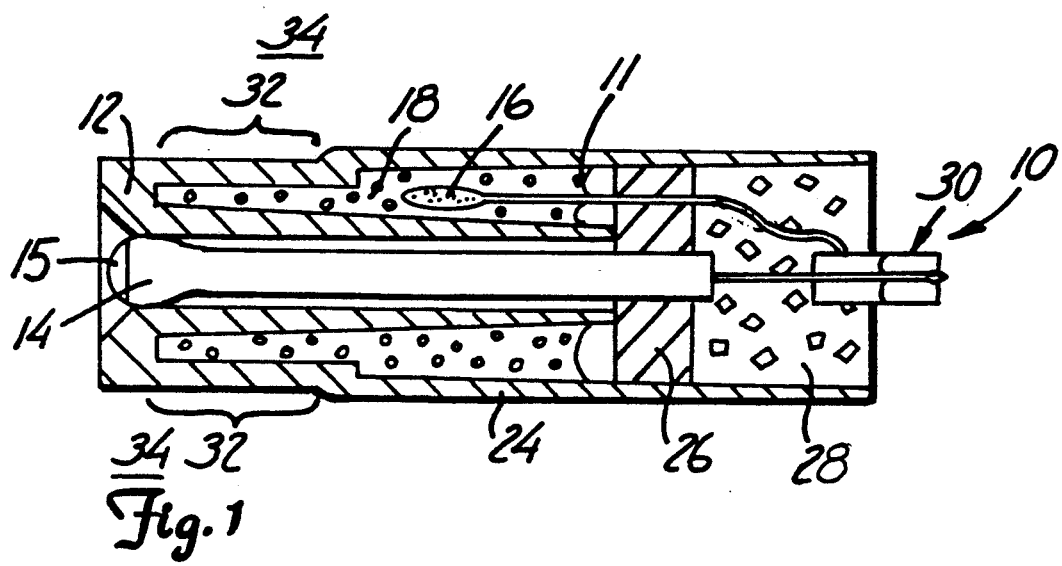
FIG. 1 is a sectional view of the electrochemical cell sensor of the present invention.

The present invention includes an electrochemical cell sensor 10 having a reference half cell 11 with an ion diffusion junction that is impermeable to fluid flow. In the preferred embodiment 10 illustrated in FIG. 1, the sensor 10 includes a housing 12, an indicator or ion measuring electrode 14, and the reference half cell 11.

The housing 12 may be made by any suitable means such as molding, casting, or extrusion. One preferred method of producing the housing 12 is injection molding. The housing may be made of a thermoplastic, a thermoset plastic, a rubber, a ceramic, or a glass. Although the preferred housing 12 is of a type that houses both the ion specific electrode 14 and the reference half cell 11, the present invention is also applicable to housings that include only the reference half cell.

The reference half cell includes a electrode 16 disposed in an electrolyte 18 within the housing 12. Both the electrolyte 18 and the electrode 16 are preferably electrically separated from the ion specific electrode 14 by an inner wall 22 that is generally cylindrical in configuration. Alternatively, the electrode 14 can have a glass body which provide the desired electrical insulation. The inner wall 22 encloses the ion specific electrode 14 except for a active region or distal portion 15, which is exposed to a sample solution 34. The housing 12 further includes an outer wall 24 that is also generally cylindrical in configuration forming the outer wall of the sensor 10. The outer surface of the inner wall 22 and the inner surface of the outer wall 24 form an enclosure that houses the electrode 16 and the electrolyte 18.

The sensor 10 is sealed by a suitable plug 26 and potting material 28 that are well known in the art. A connector 30 is used to connect both the ion specific electrode 14 and the electrode 16 to a suitable instrument (not shown) for indicating or recording the potential being sensed.

An ion diffusion junction 32 separates the electrolyte 18 from the sample solution 34 which is the solution of interest. The ion diffusion junction 32 of the present invention is impermeable to fluid flow and preferably an integral portion of the sensor housing 12. Being impermeable to fluid flow and being an integral portion of the sensor housing eliminates leakage problems that are associated with traditional junctions. In addition, since the junction is an integral part of the housing, the housing and the junction are made simultaneously decreasing production costs.

The junction 32 of the present invention includes a solid matrix in which a plurality of inclusions are disposed. By inclusions is meant any material, either hollow or solid having at least a solid surface. The material may be organic or inorganic and in the form of flakes, crystals, particles, beads, or fibers, or a mix of such materials. One preferred material for use as inclusions is glass fibers.

The junction is characterized by hydrolytic activity along the inclusions. By hydrolytic activity is meant that reaction (hydrolysis) which produces a weak base or a weak acid by reaction with water. The hydrolysis can occur along the interfaces between the matrix substance and the inclusion substance, or the inclusions may have hydrolyzable surface layers, or a hydrolyzable coating may be applied to the inclusions, or a combination of any one of the above.

The hydrolytic activity is necessary for ion diffusion to occur along an interface or interfaces between the inclusions and the matrix. The inclusions are oriented to form continuous ion diffusion pathways within the matrix from a surface of the junction facing the electrolyte 18 to an opposing surface of the junction facing the sampling solution 34. The ion diffusion pathways are not porous in the common sense of the word. The ion diffusion pathways permit the transfer of ions along the pathways by diffusion. If a pore size equivalent were to be estimated, it is believed that the equivalent would be less than 0.025 microns.

Preferably, the matrix and inclusions are made of inert materials such that when the inclusions and the matrix are exposed to the aqueous sample solution, hydrolysis occurs. In addition, a hydrolyzable coating can be applied to the inclusion to enhance hydrolysis. Since the junction matrix material and the inclusions are in contact with both the sample solution and the reference electrolyte, the material chosen for the inclusion and the junction matrix material must be electrically insulative.

The junction matrix is preferably made of the same material as the housing thereby making the junction integral with the housing. The junction material may be a thermoplastic, a thermoset plastic, a liquid crystal, a rubber, a ceramic, a glass, or a combination of such materials. Preferably, the junction matrix is a thermoplastic.

One method of producing continuous ion diffusion pathways within the junction 32 is by injection molding the sensor housing 12 using glass fibers as inclusions interspersed within the thermoplastic. A preferred material is part number 107Z with 1% titanium dioxide as a white colorant prepared by RTP Company of Winona, Minnesota USA. Sizing is preferably included, which may include starch-like materials, silanes and the like. Sizing is coated on to the glass fibers as a hydrolyzable layer prior to molding.

In order for the ion diffusion pathways to act as such, the pathways must be contiguous from the sample solution to the reference electrolyte. In the case of glass fibers, if the wall thickness of the junction exceeds the length of the fiber, the ion diffusion rate may be very low, and possibly so low that the junction is unusable. In the case where the molded design in an injection molding process tends to align the glass fibers with the polymer melt flow, few of the glass fibers will be oriented transverse to the melt flow and available as such to form ion diffusion pathways across the junction. In either case, the wall of the junction must then be reduced to a selected fraction of the length of the glass fibers.

Alternatively, the mold can be designed to produce disordered flow regions disordering the fibers in the area of the housing which is intended for the junction. Some percentage of the fibers will become oriented transversely to the melt flow so that contiguous ion diffusion pathways are formed across the wall of the housing in the area of the junction.

Figure 2:
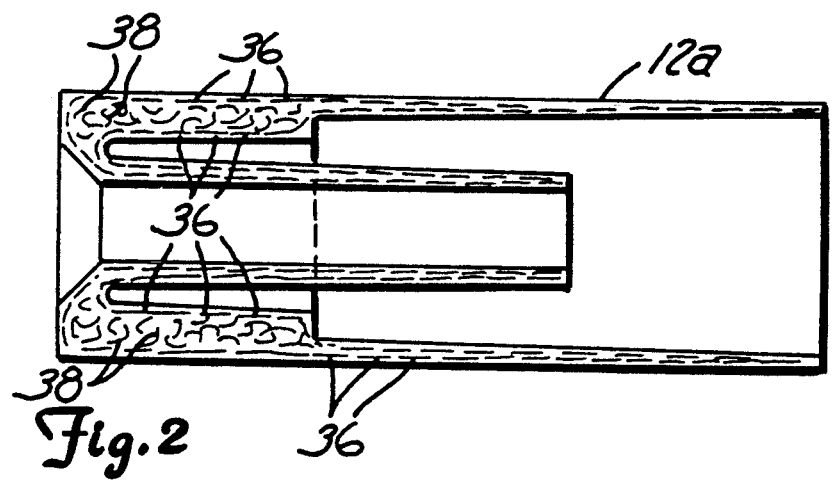
FIG. 2 is a sectional view of the cell housing of the cell sensor of the present invention prior to machining.

As illustrated in FIG. 2, a housing 12a shown in cross section indicates ordered flow regions which include oriented fibers 36 and a disordered flow region which includes randomly dispersed fibers 38. The fibers 36 are oriented in an orderly fashion near the surfaces of the housing 12a. The randomly dispersed fibers 36 have a portion of their population which is transverse to the direction of the melt flow and which extend between opposing ordered flow regions. The fibers 38 constitute the ion diffusion pathways.

The transverse fibers 38 must be exposed so that hydrolysis can occur to form the ion diffusion pathways between the matrix and the inclusions. The ordered flow regions are removed to the extent needed to expose the fibers to the surface.

Figure 3:
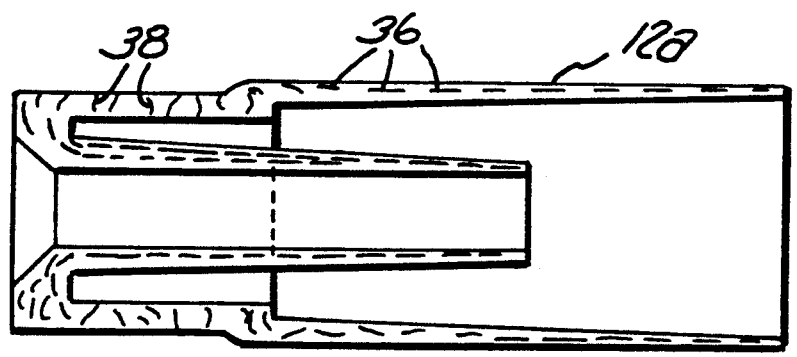
FIG. 3 is a sectional view of the housing of the cell sensor of the present invention after machining.

A number of methods may be used to expose the transversely oriented fibers 38, depending on the matrix material. These methods for removing of the matrix material include chemical, thermo, ionic, electrical, plasma, or mechanical methods. In the example discussed wherein the matrix material is a thermoplastic and the inclusions are glass fibers, a machining operation is presently preferred to produce the junction 32 as illustrated in FIG. 3.

The diffusion properties of the junction 32 are controlled by adjusting any one or combination of a number of parameters including surface area of the junction, length of the glass fibers, the depth of removal of the ordered flow region, the thickness of the junction, and the extent of fiber orientation.

With regard to surface area of the junction, the diffusion rate can be controlled by the amount of surface area that is exposed by machining or other operation. Along the areas of the housing in which the ordered flow region is not removed, the oriented fibers 36 remain along with the thermoplastic skin formed during the molding process, making ion diffusion through such areas negligible.

The fiber length can also be varied to increase or decrease ion diffusion rate since each fiber and/or each chain of intimate fibers contiguous between the sample solution and the electrolyte defines a hydrolyzed ion diffusion pathway. If the fiber length is increased, the diffusion rate is increased. Decreasing the fiber length will decrease the number of fibers which form continuous pathways from the electrolyte surface to sample solution surface thereby decreasing the diffusion rate.

As discussed previously, the dynamics of the molding process can also be controlled to minimize or maximize the ordered flow region thereby increasing or decreasing the number of fibers that become transversely orientated in the matrix. The ordered flow regions can be seen as regions which tend to have more laminar flow during molding and the disordered regions can be seen as regions which tend to have more turbulent flow during molding.

Ion diffusion can also be controlled by increasing or decreasing the wall thickness of the junction area thereby increasing or decreasing the number of fibers that form pathways between the reference solution surface and the sample solution surface.

The composition of the material at the junction may also be changed to increase or decrease the number of ion diffusion pathways. For example, increasing the fiber content of the junction relative to the amount of matrix material will increase the number of ion diffusion pathways, and therefore increase the diffusion rate. Similarly, the inclusion material and the matrix material may be selected for ease of hydrolysis to occur. The more hydrolyzable the ion diffusion pathways are, the less resistant such materials are to ion diffusion, increasing ion diffusion. In addition, the interface between the inclusions and the matrix may be made more hydrolyzable by coating the inclusions prior to molding with the hydrolyzable coating.

Due to the unique ion diffusion pathways of the present invention junction, the junction wall can be made thicker thereby decreasing costs and increasing the structural integrity of the junction. For example, in one working embodiment, the junction wall has been as thick as 0.12 inches which is four times the thickness of commonly used prior art junctions.

In addition, the junction of the present invention requires no boiling or pressurizing to activate the junction, as many prior art junctions require.

The electrolyte 18 is a solid electrolyte having a solid electrolyte matrix of bound salt granules and a hydrophilic, long chain polymer. The electrolytic salt is immobilized within a binder and the hydrophilic polymer chains provide a mechanism for ion diffusion through the solid. A high boiling point alcohol is also added to enhance solvation of the salt in the presence of uncured epoxy components, which enhances both initial wetting and rewetting after the probe is exposed to air. A minimum amount of water is incorporated to hydrate the electrolyte and the junction 32. In a preferred embodiment, the solid electrolyte 18 is used with the junction 32. However, it is within the scope of the present invention to use the junction 32 with prior art electrolytes, and conversely, using the solid electrolyte of the present invention with conventional liquid junctions.

The electrolyte matrix may be made of any type of adhesive or cohesive insulating material such as epoxy, cyanoacrylates, silicones, urethanes, ceramics, and waxes. Preferably, the binder is a two-part epoxy such as TRA-BOND F117 resin and hardener from Tra-con Inc. of Medford, Massachusetts, USA. The binder immobilizes the salt.

The salt used is a strong electrolyte and can be any conventional salt normally used in solution in a reference half cell, such as potassium chloride. Salt in the electrolyte of the present invention is in solid form such as crystal, grain, granules, or powder. In the embodiment discussed, salt granules are preferred.

The hydrophilic polymer is a high molecular weight (2 million to 50 million) polymer that is both hydrophilic and pseudoplastic. By pseudoplastic is meant that the viscosity of the material is inversely proportional to the amount of shear that the material is exposed to. The hydrophilic polymer also must have the ability to reform polymer chains after mixing, but before the mixture cures to form a network of polymer chains within the solid electrolyte. Such a characteristic is advantageous for preparing the mixture to form the electrolyte 18. If the mixture is blended in a high shear environment and the hydrophilic polymer chains are broken due to the shear, the polymer needs to have the ability to reform upon cessation of the blending. The hydrophilic polymer thusly forms a network within the binder upon curing. It is along such network that ion diffusion is believed to occur. Preferably, the polymer is a natural biopolysaccharide. One such preferred polysaccharide is xanthan gum.

A high boiling point solvent such as glycerol is added to the binder/salt mixture to provide the salt with some solubility. The high boiling point solvent is also miscible in water and the sample solution. The solvent should have a boiling point that is suitable for the particular application temperature in which the reference half cell will be used. Glycerol and other high boiling point alcohols are within the scope of the present invention.

The wetting agent provides a mechanism to enhance ion transfer from the electrode 16 to the electrolyte 18, and from the junction 32 to the electrolyte 18. One suitable wetting agent is Tergitol Non-ionic surfactant 15-S-9 from Union Carbide Corporation of Danbury Connecticut USA.

The cell of the present invention needs only a very limited water content, such as is available from Ultra High Viscosity double junction gel Part Number 7921001 from Rosemount Analytical Inc. of Irvine, California USA, since the water is bound in the solid electrolyte matrix and is not easily lost through the junction.

The cell of the present invention also has an excess amount of salt within the electrolyte binder which is immobilized due to the solid nature of the binder. The immobility of the salt reduces ion mobility. In addition, the low concentration of the polymer network formed by the hydrophilic polymer minimizes ion diffusion. All of the above make ion concentration at the electrode very stable.

The present invention's reduced ion mobility inhibits poisoning by sample solution ion diffusion, protecting the electrode and increasing cell life.

The present invention also eliminates the problem of excess salt build-up along the junction since the excess salt is immobilized in the electrolyte binder. In addition, since the electrolyte is immobilized, the electrolyte cannot move across the junction leaving primarily sample solution within the junction with little or no pressure change error resulting therefrom.

The following example is intended to be purely exemplary and not intended to limit the present invention in any way. All concentrations are by weight, except where noted.

EXAMPLE

A solid electrolyte for use in a reference half cell was made of one part freshly mixed epoxy such as Tra-bond FI17 and three parts by weight potassium chloride granules (KCl) with diameters in the range of 0.015 to 0.030 inches. The epoxy/potassium chloride mixture is thoroughly stirred to coat all of the potassium chloride granules with the epoxy until a course putty type consistency is achieved. One-half part of a saturated KCl 2 percent by weight xanthan gum gel was added to the uncured epoxy/KCl mixture. Even smaller amounts such as 1.7% by weight each of both glycerol and Tergitol are added to enhance solvation of the KCl and wetting of the electrode/electrolyte and electrolyte/junction interfaces.

The mixture was then whipped into a creamy paste and placed within the electrode housing 12 with the electrode 16 positioned within the electrolyte mixture.

The electrolyte was then permitted to cure. The electrode 16 was an Ag/AgCl electrode. The cell 11 of the present invention performed similarly to a standard liquid filled reference half cell.

Although the present invention has been described with reference to preferred embodiments, workers skilled in the art will recognize that changes may be made in form and detail without departing from the spirit and scope of the invention.

What is claimed is:

1. A solid electrolyte for use in a reference electrochemical half cell having an electrode and a junction, the electrolyte comprising:
   an insulative binder forming a matrix;
   a particulate salt dispersed within the binder and immobilized by the binder; and
   a hydrophilic polymer network disposed within the binder in an amount sufficient to effect ion diffusion within the electrolyte.

2. The electrolyte of claim and further including a high boiling point solvent within the binder in which the salt is soluble and which is also miscible in water and a solution being sampled.

3. The electrolyte of claim and further including a wetting agent in an amount sufficient to effect wetting the electrode and the junction.

4. The electrolyte of claim and further including water in an amount sufficient to hydrate the electrolyte.

5. The electrolyte of claim 1 wherein the salt is potassium chloride.

6. The electrolyte of claim I wherein the binder is an epoxy.

7. The electrolyte of claim i wherein the solvent is a high boiling point alcohol.

8. The electrolyte of claim 7 wherein the high boiling point alcohol is glycerol.

9. The electrolyte of claim wherein the hydrophilic polymer is characterized by its pseudoplastic nature.

10. The electrolyte of claim wherein the hydrophilic polymer is xanthan gum.

11. An electrochemical cell comprising:
    a housing;
    a solid electrolyte disposed within the housing, the electrolyte including a particulate salt disposed within an insulative binder and a hydrophilic polymer network disposed within the binder in an amount sufficient to effect ion diffusion within the electrolyte;
    an electrode disposed within the electrolyte and in conductive relationship therewith; and
    a junction in electrical relationship with the electrolyte and with a solution being sampled such that ion diffusion occurs through the junction.

12. The cell of claim 11 and further including a high boiling point solvent within the binder in which the salt is soluble, and which is also miscible in water and the solution being sampled.

13. The cell of claim I and further including a wetting agent in an amount sufficient to effect ion transfer through the electrolyte between the electrode and the junction.

14. The cell of claim 11 and further including water in an amount sufficient to hydrate the electrolyte.

15. The cell of claim 11 wherein the hydrophilic polymer also has a pseudoplastic nature.

* * * * *

UNITED STATES PATENT AND TRADEMARK OFFICE
CERTIFICATE OF CORRECTION

PATENT NO. : 5,071,721

DATED : December 10, 1991

INVENTOR(S) : Barry W. Benton

It is certified that error appears in the above-identified patent and that said Letters Patent is hereby corrected as shown below:

Col. 2, line 36, delete "half cell" and insert --half cell 11.--

Col. 7, line 21, delete "claim" and insert --claim 1--.

Col. 7, line 26, delete "claim" and insert --claim 1--.

Col. 7, line 29, delete "claim" and insert --claim 1--.

Col. 7, line 33, delete "claim I" and insert --claim 1--.

Col. 8, line 1, delete "claim 1" and insert --claim 1--.

Col. 8, line 5, delete "claim" and insert --claim 1--.

UNITED STATES PATENT AND TRADEMARK OFFICE
CERTIFICATE OF CORRECTION

PATENT NO. : 5,071,721

DATED : December 10, 1991

INVENTOR(S) : Barry W. Benton

It is certified that error appears in the above-identified patent and that said Letters Patent is hereby corrected as shown below:

Col. 8, line 7, delete "claim" and insert --claim 1--.

Col.8, line 26, delete "claim I" and insert --claim 1--.

Signed and Sealed this

Twentieth Day of April, 1993

Attest:

MICHAEL K. KIRK

*Attesting Officer*  *Acting Commissioner of Patents and Trademarks*